United States Patent [19]
Ueki et al.

[11] Patent Number: 5,142,392
[45] Date of Patent: * Aug. 25, 1992

[54] COLOR LIQUID CRYSTAL DISPLAY DEVICE HAVING LIGHT SHIELDING LAYERS AND METHOD OF MANUFACTURING

[75] Inventors: Toshihiro Ueki, Machida; Yasuhisa Oana, Yokohama; Hitoshi Tomii, Ebina, all of Japan

[73] Assignees: International Business Machines Corporation, Armonk, N.Y.; Kabushiki Kaisha Toshiba, Kawasaki, Japan

[ * ] Notice: The portion of the term of this patent subsequent to Jan. 28, 2009 has been disclaimed.

[21] Appl. No.: 693,621

[22] Filed: Apr. 30, 1991

Related U.S. Application Data

[62] Division of Ser. No. 246,835, Sep. 20, 1988, Pat. No. 5,083,853.

[30] Foreign Application Priority Data

Nov. 18, 1987 [JP] Japan ................. 62-291677

[51] Int. Cl.⁵ .............................................. G02F 1/13
[52] U.S. Cl. ....................................... 359/67; 359/68; 359/87
[58] Field of Search ............... 350/333, 334, 339 F; 359/67, 68, 79, 87

[56] References Cited

U.S. PATENT DOCUMENTS 4,712,874 12/1987 Sekimura et al. ............. 350/339 F
4,950,058 8/1990 Drem et al. .................... 350/333

FOREIGN PATENT DOCUMENTS 0179922 6/1986 European Pat. Off. .
0238174 4/1987 European Pat. Off. .
62291677 2/1962 Japan .
60-43631 9/1986 Japan .
62-22629 2/1987 Japan .
62-150221 7/1987 Japan .

Primary Examiner—Stanley D. Miller
Assistant Examiner—Huy K. Mai
Attorney, Agent, or Firm—Oblon, Spivak, McClelland, Maier & Neustadt

[57] ABSTRACT

Disclosed is a color liquid crystal display device having a plurality of pixels, in which conductive films are arranged at regions corresponding to the respective pixels, a light-shielding conductive layer is connected to the conductive films and extends in a region between the pixels, and color filters are formed on the conductive films. In the method of manufacturing such color liquid crystal display device, a light-shielding conductive layer is formed on a substrate, part of the light-shielding layer corresponding to a pixel for which a filter is to be formed is removed from the substrate on which the light-shielding layer is formed and simultaneously the light-shielding layer is partially removed so that portions thereof corresponding to at least pixels having different colors are electrically insulated from each other, a conductive film is formed at a portion corresponding to the pixel for which the filter is to be formed, and films having colors corresponding to those of the respective pixels are formed on the surface of the conductive film.

3 Claims, 5 Drawing Sheets

COLOR LIQUID CRYSTAL DISPLAY DEVICE HAVING LIGHT SHIELDING LAYERS AND METHOD OF MANUFACTURING THEREOF

This is a division of application Ser. No. 07/246,835, filed on Sep. 30, 1988, now U.S. Pat. No. 5,083,853.

The present application claims priority of Japanese Patent Application No. 62-291677 filed on Nov. 18, 1987.

FIELD OF THE INVENTION AND RELATED ART STATEMENT

The present invention relates to a color liquid crystal display device having a color filter and capable of performing color display, and to a method of manufacturing thereof.

Generally, in a liquid crystal display device, transparent electrodes are formed on opposing surfaces of glass substrates, which are arranged to oppose each other, to constitute a plurality of pixels, and a liquid crystal composition is sandwiched between these electrodes.

In such a liquid crystal display device, a light-shielding member is provided between pixels in order to prevent light leakage from the adjacent pixels, thereby obtaining high contrast.

For example, according to a technique disclosed in Japanese Laid-Open Gazette (Kokai) No. 59-188690, a light-shielding metal layer is formed on an entire surface of a substrate by vacuum deposition or sputtering method. The metal layer is etched to have a required shape by photoetching method. A protective layer is formed on the entire surface of the resultant structure. Transparent electrodes are provided on the protective layer.

Japanese Laid-Open Gazette (Kokai) No. 60-43631 discloses a display panel in which a non-translucent member made of a thin metal film is formed between color filters.

As a method of forming a red (R), green (G), or blue (B) color filter at a position of a color liquid crystal display device corresponding to each pixel, a dye method as an application of photolithography, a printing method as an application of offset printing or screen printing, and the like are conventionally available.

With the dye method, however, the decrease in throughput or manufacturing yield occurs to adversely affect the manufacturing costs. With the printing method, the precision of the device is not satisfactory.

For these reasons, recently, a technique for forming a color filter by electrodepositon method is developed and problems of manufacturing costs and precision are being solved. More specifically, with the electrodeposition method, a large size screen can be realized, the processing time can be shortened, the heat, optical, and chemical resistances are high, and the film thickness can be freely and accurately controlled.

However, in formation of a color filter with the electrodeposition method, when a light-shielding layer is to be formed between the pixels in order to obtain high contrast in accordance with the technique disclosed in Japanese Laid-Open Gazettes (Kokai) Nos. 59-188690, 60-43631, and the like, as described above, various problems occur.

More specifically, in the technique disclosed in Japanese Laid-Open Gazette (Kokai) No. 59-188690, since the electrode on which a filter is to be formed and the metal non-translucent layer are electrically insulated by the protective layer, the non-translucent layer cannot be used as an electrodeposition electrode. If a filter is to be formed by electrodeposition, a non-translucent layer, a protective layer, and a transparent electrode must be formed. Thereafter, an electrodeposition electrode must be connected to the transparent electrode, a filter must be formed by electrodeposition method, and then the electrodeposition electrode must be removed. As a result, the manufacturing process requires a large number of steps.

With the technique disclosed in Japanese Laid-Open Gazette (Kokai) No. 60-43631, since an opposing electrode, on which filters are to be formed, is provided not only on the pixel region but on the entire surface of the substrate, a filter member cannot be formed on only the pixel region by electrodeposition method.

OBJECT AND SUMMARY OF THE INVENTION

It is an object of the present invention to manufacture a color liquid crystal display device in which light between pixels is shielded in accordance with electrodeposition method and with a small number of manufacturing steps.

A color liquid crystal display device according to the present invention has a plurality of pixels. A conductive film is arranged at a region corresponding to each pixel. A light-shielding conductive film is formed to be connected to the conductive film and extends in a region between the pixels. A color filter is formed on the conductive film.

According to a method of manufacturing the color liquid crystal display device according to the present invention-, a light-shielding conductive layer is formed on a substrate. Part of the light-shielding layer at a position corresponding to a pixel, for which a filter is to be formed, is removed, and simultaneously the light-shielding layer is partially removed such that portions thereof corresponding to at least pixels of different colors are electrically insulated. A conductive film is formed at a position corresponding to a pixel for which a filter is to be formed, and a film of a color corresponding to that of the corresponding pixel is formed on the surface of the conductive film.

In the present invention, the light-shielding conductive film is electrically connected to the conductive film on which a color filter is to be formed. Therefore, when the light-shielding layer is used as a deposition short-circuiting electrode, a color filter and the light-shielding layer can be formed without increasing the number of manufacturing steps compared with conventional electrodeposition method.

DETAILED DESCRIPTION OF PREFERRED EMBODIMENTS

Preferred embodiments of the present invention will be described in detail with reference to the accompanying drawings.

Figure 1:
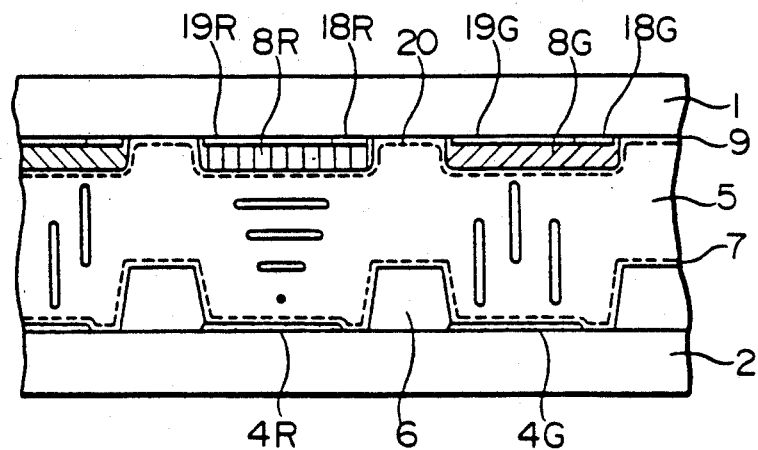
FIG. 1 is a longitudinal sectional front view of a color liquid crystal display device according to an embodiment of the present invention.

FIG. 1 is a longitudinal sectional view of a color liquid crystal display device according to an embodiment of the present invention.

The color liquid crystal display device shown in FIG. 1 has a glass substrate 1 on which a color filter is to be formed, and a glass substrate 2 which opposes the glass substrate 1 and on which a semiconductor drive circuit is to be arranged. A twisted-nematic (TN) liquid crystal 5 is sandwiched between the glass substrates 1 and 2. This is the basic structure of the device shown in FIG. 1.

Circuits for the respective pixels are arranged in a matrix manner on the entire surface of the glass substrate 2. Each pixel has a transparent pixel electrode (i.e., a display electrode) 4R, 4G, or the like and an amorphous silicon thin film transistor (a-SiTFT; not shown). In this manner, a display surface having a plurality of matrix pixels is constituted. Ta or Al gate electrode wirings 6 having a width of about 50 μm and source electrode wirings (not shown) having a width of about 20 μm are connected to the gates and sources of the thin film transistors (TFTs) in units of rows and columns, and an orientation film 7 is formed to cover these wirings.

Figure 2:
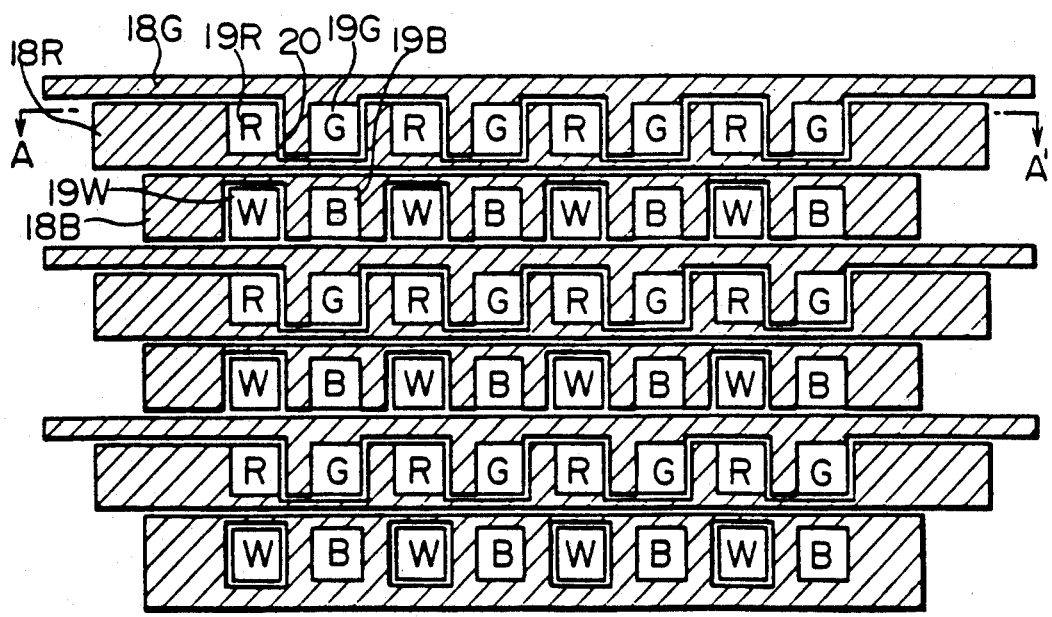
FIG. 2 is a partial plan view showing a pattern of transparent conductive films and light-shielding layers arranged on the substrate shown in FIG. 1.

FIG. 2 shows a pattern of transparent conductive films and light-shielding conductive layers arranged on the glass substrate 1 shown in FIG. 1.

Figure 3:
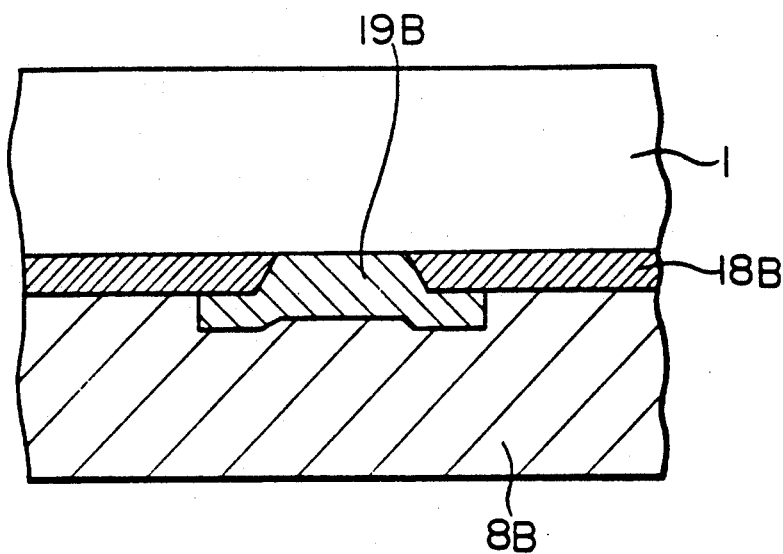
FIG. 3 is a partial sectional view of FIG. 2.

In the color liquid crystal display device shown in FIGS. 1 and 2, one display element consists of pixels of four different colors. Namely, a square red pixel, a square green pixel, a square blue pixel, and a square white (transparent) pixel are arranged at the upper left portion, the upper right portion, the lower right portion, and the lower left portion, respectively, that constitute a unit square. FIG. 1 is a partial sectional view taken along the line A—A' of FIG. 2. FIG. 3 is a partial sectional view of a blue pixel region of the glass substrate 1.

The liquid crystal display device shown in FIGS. 1 to 3 has a structure as follows. Namely, transparent conductive films 19R, 19G, and 19B are arranged at regions of the glass substrate 1 that respectively correspond to red, green, and blue pixels (i.e., a red pixel electrode 4R, a green pixel electrode 4G, and a blue pixel electrode (not shown)). Light-shielding conductive layers 18R, 18G, and 18B are formed to be electrically connected to the transparent conductive films 19R, 19G, and 19B, respectively, and to extend in regions between the red, green, blue, and white pixels, respectively. Red, green, and blue filters 8R, 8G, and 8B are stacked on the transparent conductive films 19R, 19G, and 19B, respectively. The transparent conductive films 19R, 19G, and 19B are paired with the red pixel electrode 4R, the green pixel electrode 4G, and the blue pixel electrode (not shown), respectively. Each pair serves as electrodes for driving the liquid crystal. The light-shielding layer 18R electrically connects the plurality of red pixel transparent conductive films 19R. The light-shielding layer 18G electrically connects the plurality of green pixel transparent conductive films 19G. The light-shielding layer 18B electrically connects the plurality of blue pixel transparent conductive films 19B. Gaps 20 between the layers 18G and 18R, between 18R and 18B, and between 18B and 18G, i.e., the regions electrically insulating these light-shielding layers are aligned with the gate electrode wirings 6 or the source electrode wirings (not shown) arranged on the glass substrate 2. Since these electrode wirings are non-translucent, they have a light-shielding effect.

In the liquid crystal device shown in FIG. 1, the red, green, and blue filters 8R, 8G, and 8B cover not only the transparent conductive films 19R, 19G, and 19B, but also the light-shielding layers 18R, 18G, and 18B, respectively. Since these light-shielding layers are located outside the pixel regions, no problem occurs in practice.

Only a transparent conductive film 19W is formed at a region of the glass substrate 1 corresponding to a white pixel. Since no color filter is formed on the film 19W, a light-shielding layer is not connected to the film 19W.

Each of the light-shielding layers 18R, 18G, and 18B is made of a 60 wt % Mo-40 wt % Ta alloy and has a thickness of about 1,500 Å and an optical density (O.D.) of 2.0. The width of the gap 20 between adjacent light-shielding layers (i.e., layers 18R and 18G) of pixels for color filters of different colors is in the range of 10 to 20 μm. When the optical density (O.D.) of the light-shielding layer 18R, 18G, or 18B is smaller than 1.5, the light-shielding layer does not often serve satisfactorily as a light-shielding layer. The width of the gap 20 is smaller than the range mentioned above, when the red, green, and blue filters 8R, 8G, and 8B are formed by an electrodeposition method to be described later, short circuiting easily occur; if larger, a sufficient light-shielding effect cannot be obtained with the gate electrode wirings and the source electrode wirings (not shown).

Each of the transparent conductive films 19R, 19G, and 19B is made of, for example, ITO (indium-tin-oxide) and has a thickness of about 1500 Å.

The light-shielding layer 18R, 18G, or 18B partially overlaps with the transparent conductive film 19R, 19G, or 19B, for about 4 to 20 μm within a portion corresponding to the corresponding pixel electrode 4R, 4G, or the like formed on the glass substrate 2. As a result, a light-shielding layer and a corresponding transparent conductive film are electrically, reliably connected to each other (see FIG. 3).

The red, green, and blue filters 8R, 8G, and 8B are formed by electrodepositon method by using the light-shielding layers 18R, 18G, and 18B as the electrodeposition electrodes, respectively, and have a thickness of about 1 to 1.5 μm. When the thickness of the red, green, and blue filters 8R, 8G, and 8B is smaller than this range, problems tend to occur in terms of coloring; when larger, problems tend to occur in terms of cell gap control and alignment treatment.

In the color liquid crystal display device of this embodiment having the above-described structure, the light-shielding layer for electrically connecting transparent conductive films arranged in a plurality of pixel regions of the same color can be used as an electrodeposition electrode for stacking a filter member of the same color. Therefore, the light-shielding layers and the filters can be formed with a smaller number of manufacturing steps.

In this embodiment, since the red, green, and blue filters 8R, 8G, and 8B are formed by electrodeposition method, gaps 20 having a width of about 10 to 20 μm exist between adjacent light-shielding layers for pixels for color filters of different colors. Light can leak from the gaps 20 to degrade the contrast. However, because of the light-shielding effect with the gate electrode wirings 6 and the source electrode wirings (not shown) formed at portions on the glass substrate 2 corresponding to the gaps 20, light leakage is prevented and high contrast can be maintained.

A method of manufacturing the color liquid crystal display device will be described with reference to FIG. 4.

Figure 4A:
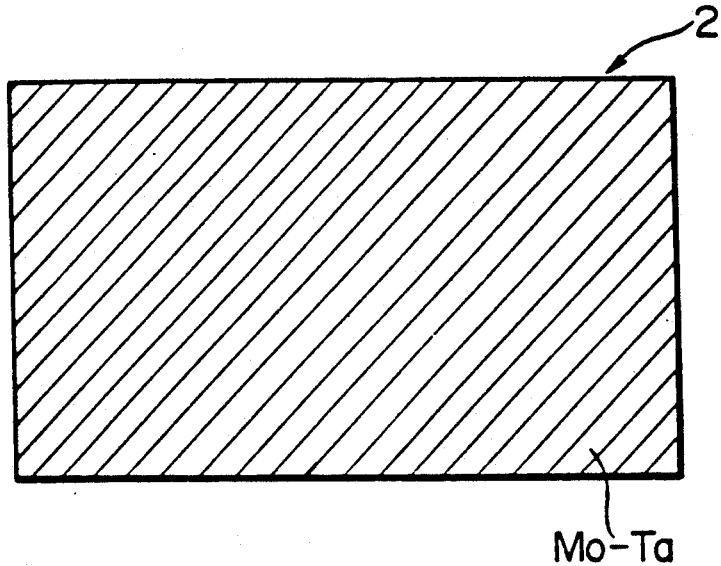
FIGS. 4(a-e) is a partial plan view for explaining a method of manufacturing a color liquid crystal display device according to the embodiment of the present invention.

A 60 wt % Mo-40 wt % Ta layer (O.D.=2.0) having a thickness of 1,500 Å is deposited on the entire surface of the glass substrate 1 by sputtering method (FIG. 4(a)).

Figure 4B:
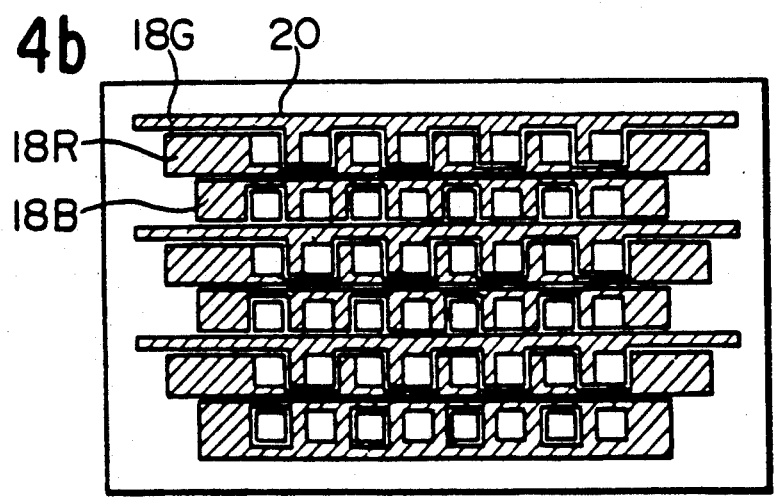

Subsequently, the 60 wt % Mo-40 wt % Ta layer is removed by photolithography such that it partially remains as a connecting portion for electrically connecting the same color pixels of the same row outside a position slightly (2 to 5 μm) inward a position corresponding to the pixel electrode 4R, 4G, or the like formed on the glass substrate 2, and that a gap 20 having a width of about 10 to 20 μm is present between the adjacent light-shielding layers (i.e., between layers 18R and 18G, between 18G and 18B, and between 18B and 18R) of pixels for color filters of different colors (FIG. 4(b)).

Figure 4C:
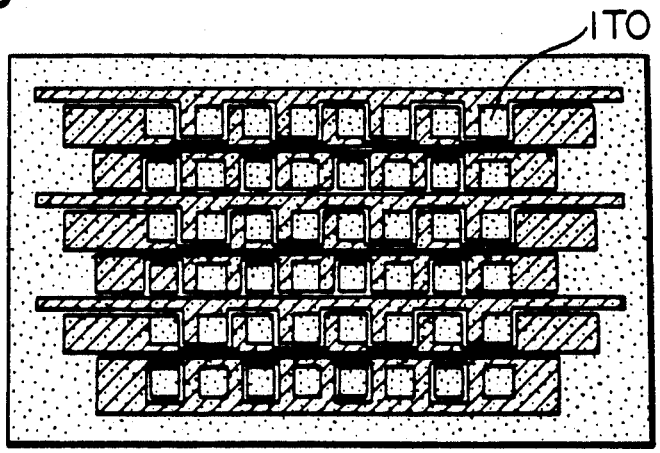

ITO having a thickness of 1,500 Å is deposited on the entire surface of the glass substrate 1 by sputtering method (FIG. 4(c)).

Figure 4D:
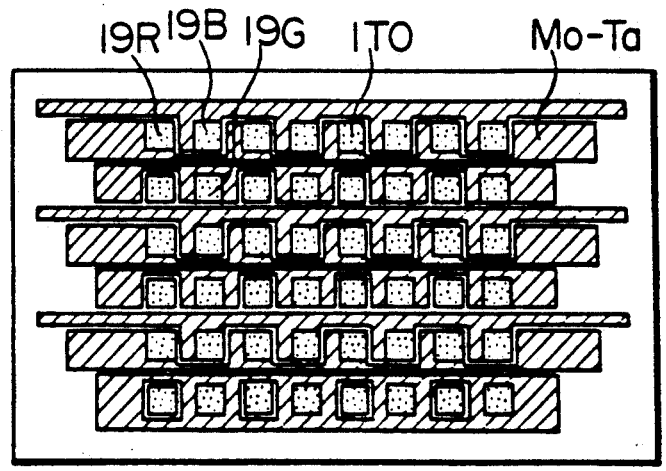
Figure 4E:
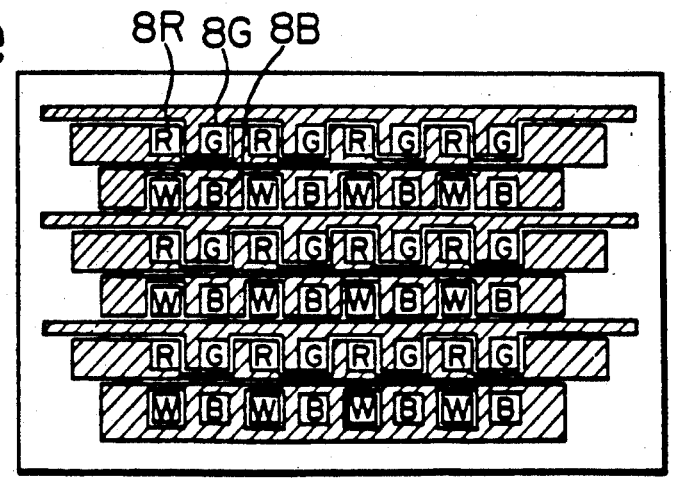

Only portions of the ITO layer corresponding to the pixel electrodes 4R, 4G, and the like formed on the glass substrate 2 are remained and the other portions are removed by photolithography (FIG. 4(d)). As a result, the transparent conductive films 19R, 19B, and 19G are formed.

Subsequently, by utilizing the light-shielding conductive film 18G for electrically connecting the transparent conductive films 19G arranged in the green pixel regions as an electrodeposition short-circuiting electrode, green filters 8G are stacked on the transparent conductive films 19G. In this case, the green filter material is also formed on the light-shielding layers 18G (not shown in FIG. 4(d)). However, since the light-shielding layer 18G is located outside the pixel regions, no problem occurs. Subsequently, red filters 8R are stacked on the transparent conductive films 19R arranged in the red pixel regions, and blue filters 8B are stacked on the transparent conductive films 19B arranged in the blue pixel regions. Since electrodeposition is performed from the outside of the connection wire, filters are formed in the order of green, red, and blue by electrodeposition method in the structure shown in FIG. 2. Each filter has a thickness of about 1 to 1.5 μm (FIG. 4(e)).

Then, the alignment film 9 is formed in accordance with the conventional manner.

In the manufacturing method described above, the short-circuiting of the transparent electrodes of the pixel regions which is performed in the conventional electrodeposition method can be performed during formation of the light-shielding layers. Therefore, the color filters and the light-shielding layers can be formed without increasing the number of manufacturing steps compared with the conventional electrodeposition method.

Figure 5:
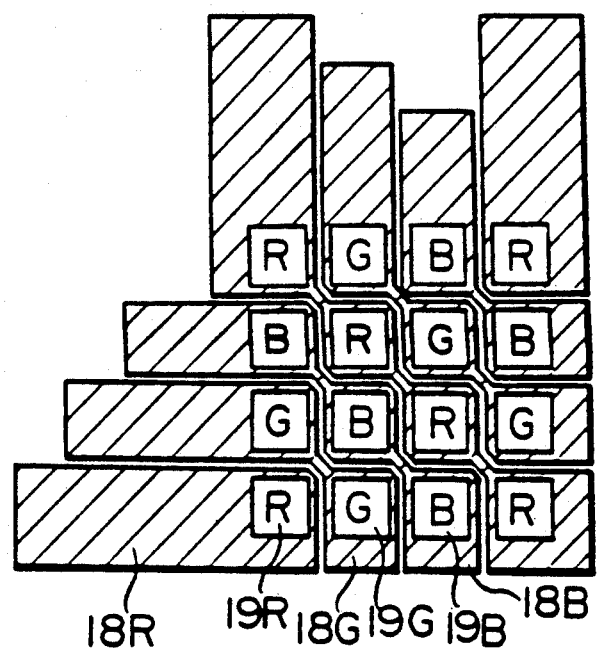
FIGS. 5, 6, and 7 are respectively partial plan views of different color liquid crystal display devices according to other embodiments of the present invention.
Figure 6:
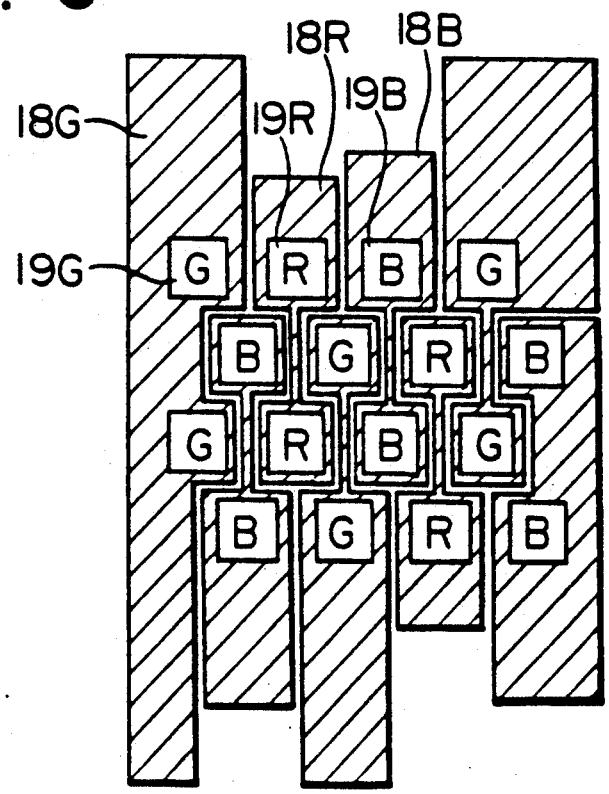
Figure 7:
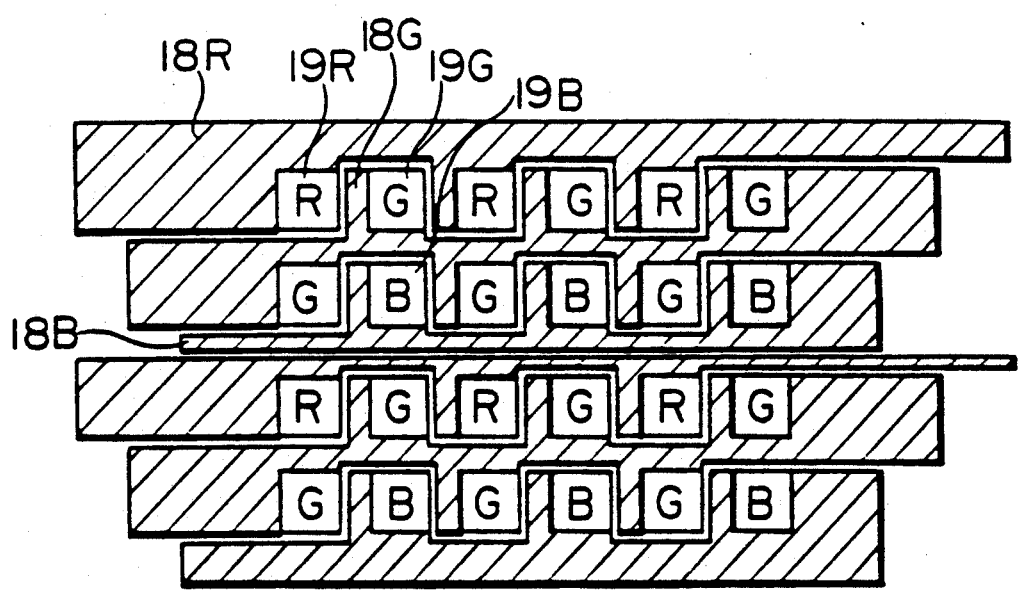

In the above embodiment, a single display element consists of color pixels of four different colors. However, the single display element may consist of pixels of three different colors, e.g., red, green, and blue. In this case, the pixels can have a combination of mosaic patterns of red, green, and blue pixels, as shown in FIG. 5; a combination of triangular patterns of red, green, and blue pixels, as shown in FIG. 6; or a combination of square patterns of a red pixel and a blue pixel and two green pixels, as shown in FIG. 7.

In the above embodiment, the alignment film 9 is directly coated on the color filters. However, as the thickness of the TN liquid crystal 5 is decreased, the height difference (step difference) between the color filters and the remaining portions undesirably changes the substantial thickness of the TN liquid crystal 5. In order to prevent this, an acrylic resin or urethane resin can be coated to cover the nonuniform surface including the transparent conductive films 19W, thus providing a flat surface, and thereafter the alignment film 9 may be coated.

Each transparent conductive film 19W may have an electrodeposition electrode like those of other color filters, and a white filter may be stacked on the film 19W by electrodeposition. In this case, an opaque (gray) filter may be used in place of a transparent filter in order to control the transmittance. The nonuniform surface of a case wherein a transparent or translucent filter is used can be uniformed in accordance with the above-described manner.

In the above embodiment, the light-shielding layer is made of a 60 wt % Mo-40 wt % Ta alloy. However, the light-shielding layer can be made of other metals such as Mo, Ti, Ta, Ni, and Cr.

As described above, according to the color liquid crystal display device and a method of manufacturing thereof according to the present invention, a light-shielding layer for electrically connecting conductive films on which color filters are to be formed can be used as an electrodeposition short-circuiting electrode. Therefore, the light-shielding layer and the electrodeposition filters can be formed with a smaller number of manufacturing steps. As a result, a high-contrast color liquid crystal display device can be obtained in a low cost.

What is claimed is:

1. A method of manufacturing a color liquid crystal display device, comprising the steps of:

forming a light-shielding conductive layer on a substrate; removing part of said light-shielding layer corresponding to pixels for which filters are to be formed from said substrate on which said light-shielding layer is formed, and simultaneously removing part of said light-shielding layer so that portions thereof corresponding to at least pixels of different colors are electrically insulated from each other;

forming a conductive film at a portion corresponding to said pixel for which said filter is to be formed; and forming films having colors corresponding to those of the respective pixels on a surface of said conductive film.

2. The method of claim 1, wherein said conductive film is electrically connected to the light-shielding layer formed on the periphery of said conductive film.

3. The method of claim 1 or 2, wherein the step of forming films having colors corresponding to those of the respective pixels on said surface of said conductive film is performed by an electrodeposition method.

* * * * *